CONNECTOR FOR SUBMINIATURE ELECTRONIC COMPONENTS

Filed Feb. 1, 1963 2 Sheets-Sheet 1

William L. Callahan,
INVENTOR.
BY.
Walter R. Hind
ATTORNEY.

William L. Callahan,
*INVENTOR.*

*BY*

Walter R. Thiel

*ATTORNEY*

United States Patent Office 3,195,017
Patented July 13, 1965

3,195,017
CONNECTOR FOR SUBMINIATURE ELECTRONIC COMPONENTS

William L. Callahan, Los Angeles, Calif., assignor to Hughes Aircraft Company, Culver City, Calif., a corporation of Delaware Filed Feb. 1, 1963, Ser. No. 255,599
4 Claims. (Cl. 317—99)

This invention relates to a connector and in particular to a connector for subminiature electronic components.

As electronic components become smaller in size, the method of connecting them into a system as well as interconnecting them becomes more difficult. One method presently used is to begin with a strip of thin conductor such as copper and to solder or weld it in a progressive fashion to the desired component leads. While this method poses little problem when working with components having dimensions measured in inches or even tenths of inches, such as vacuum tubes, resistors or even transistors; however, when the components are subminiature in size typically having dimensions measured in hundredths or thousandths of inches and are mounted in modules at spaced intervals such as .050 of an inch, the attachment of a conductor to an exposed lead becomes extremely difficult and requires a slow tedious operation.

In complex electronic systems, such as control systems for missiles and satellites, reliability of the individual components of the system is extremely important because of the interdependency of the components. As an example, the failure of a single diode in an electronic power supply may cause a complete systems failure since the power supply by nature is interconnected with other systems.

One way a component may fail is by disconnection such as when the component lead separates from the electrical conductor coupling it into a system. A way to minimize this failure is to provide a conductor having two separate and distinct parts each attached independently to the lead.

Therefore, an object of this invention is to provide an improved connector for connecting subminiature electronic components.

Another object of this invention is to provide an improved connector for redundantly connecting subminiature components.

Briefly, a connector for connecting electronic components in accordance with the present invention comprises an elongated folded conductor strip and a plurality of apertures spaced at predetermined distances along the conductor strip.

These and other objects and advantages will be apparent from the following description taken in accordance with the drawings throughout which like reference characters indicate like parts, and in which.

Figure 7:
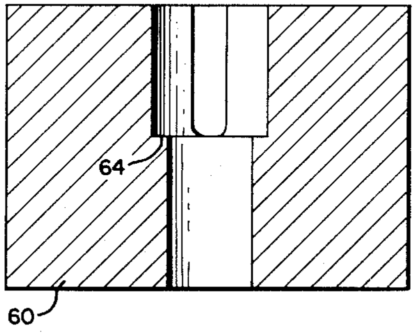
Figure 6:
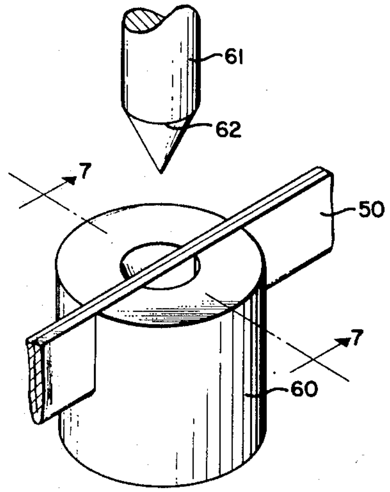

FIG. 6 is a perspective view illustrating one embodiment of a portion of a typical die and punch arrangement including a section of folded conductor that may be used to form the aperture of the second embodiment of the present invention including a section of folded conductor; and FIG. 7 is a cross-sectional view in elevation taken at 7—7 in FIG. 6 illustrating the contour of the die of the second embodiment.

Figure 1:
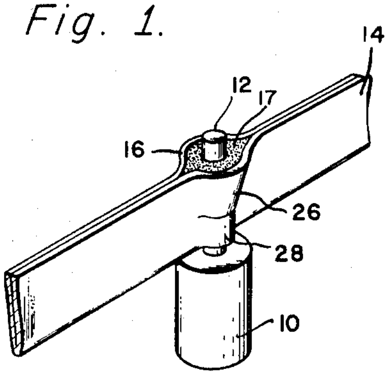
FIGURE 1 is a perspective view of a portion of a first embodiment of the present invention illustrating a typical application and omitting for clarity the solder generally included in the aperture.
Figure 2:
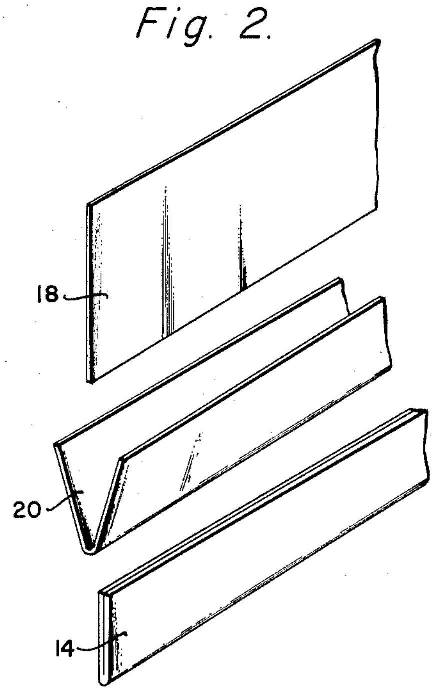
FIG. 2 is a perspective view of a portion of three conductor strips illustrating the forming of the folded conductor of the present invention.

Referring to FIG. 1 there is shown an electronic component 10 such as an encased semiconductor diode including a lead 12 inserted into a funnel shaped aperture 16 formed by adjacent parts of a folded conductor 14. As best seen in FIG. 2 in the presently preferred embodiment the folded conductor 14 is formed by folding one half of a flat thin conductor 18 such as a .005 of an inch by .060 of an inch copper ribbon above its longitudinal center line, shown at 20, until both halves of the ribbon are in contact, thus forming approximately a .010 of an inch by .030 of an inch ribbon.

The aperture of the first embodiment of the present invention has a generally funnel shape and is formed by displacing portions of the adjacent halves of the folded conductor 14. It includes a first portion 26 having a frusto-conical shape and a second portion 28 having a cylindrical shape. When the aperture 16 is positioned around the lead 12 the lead projects up through the second portion 28 into the first portion 26. Subsequently, a bonding agent 17 such as a solder or conductive epoxy typically in the form of a ring is positioned around the lead to form a conductive bond between the lead and conductor. Shown best in FIG. 4, to minimize the quantity of solder utilized for each connection the cylindrical second portion 28 has a height having a dimension B that is substantially the same as the dimension $D_2$ of its diameter.

Figure 3:
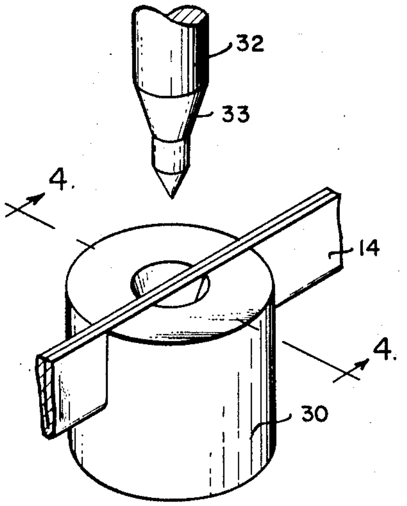
FIG. 3 is a perspective view illustrating one embodiment of a portion of a typical die and punch arrangement that may be used to form the aperture of the first embodiment of the present invention including a section of folded conductor.
Figure 4:
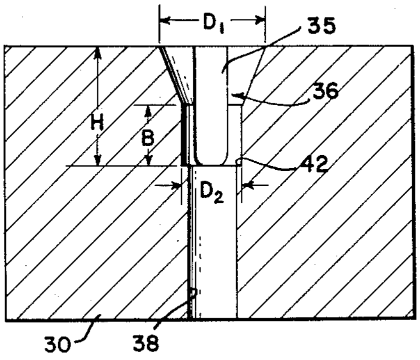
FIG. 4 is a cross-sectional view in elevation taken at 4—4 in FIG. 3 illustrating the contour of the die of the first embodiment.

Illustrated in FIGS. 3 and 4 is a typical die and punch arrangement that may be used to form the aperture 16 of the first embodiment. This arrangement includes a punch member (not shown) including a head 32 having a tip 33 configured to mate with the die 30 and to displace the folded conductor 14 to form the funnel shaped aperture 16. As best seen in FIG. 3, the die 30 includes a groove 35 having a height and width substantially the same as that of the conductor to be positioned therein and a bore 36 which has a contour of the desired aperture shape. The bore 36 typically includes a first diameter having a dimension $D_1$ which decreases to a second diameter having a dimension $D_2$, thus forming a funnel shaped contour. The height of the funnel shaped contour has a dimension H which is substantially the same as the height of the specific folded conductor to be used, while the dimension B of the height of the cylindrical portion of the funnel shaped contour is substantially the same as the dimension $D_2$ of the second diameter. To provide a means of punching out a portion of the conductor so that the aperture will have a clean edge, a shoulder 42 is formed by reducing the dimension $D_2$ of the second diameter, such as at 38.

Figure 5:
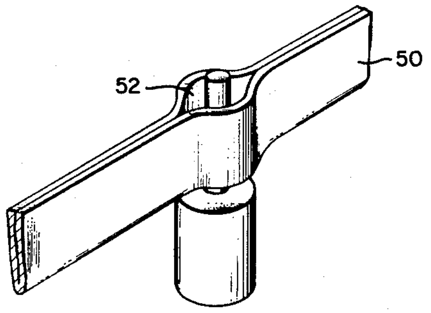
FIG. 5 is a perspective view of a portion of a second embodiment of the present invention and omitting the weld generally surrounding the aperture.

Referring now to FIGS. 5, 6 and 7, there is illustrated a second embodiment of the present invention. This embodiment is shown to include instead of the funnel shaped aperture 16 of the first embodiment, a cylindrically shaped aperture 52 formed in a folded conductor 50 such as a .010 by .030 nickel ribbon. This embodiment is particularly adapted for welding connections, since the electrodes of a welding head (not shown) can be easily positioned on either side of the cylindrical apertures to form a redundant or double weld. To form the cylindrical aperture 52 a typical die and punch arrangement similar to that for the first embodiment may be used. However, as best seen in FIG. 6 the arrangement includes a die 60 having a cylindrical contour and a punch member (not shown) including a head 61 having a tip 62 configured to mate with the die to displace the folded conductor 50 to form the cylindrical aperture 52. Again, a shoulder 64 is provided to punch out excess conductor material.

For clarity in understanding and to illustrate the relative size of the structure the following are typical dimensions.

$D_1$=.050 inch
$B$=.025 inch
$D_2$=.025 inch
$H$=.050 inch

Thus to form a plurality of connectors as described above, a section of metallic ribbon is folded 180 degrees and inserted into a die and an aperture is formed by separating the parts of the ribbon with a punch a intervals compatible with the spacing of the component leads location in the module. The ribbon may be gold plated to produce better welding capabilities and coated with a dielectric to provide insulation from adjacent circuitry. The ribbon is mated to the module by inserting the component leads through the spaced apertures. Since the ribbon is now fixed in place on the module all wire routing, component orientation and placement may be inspected prior to performing a welding or soldering operation. With the ribbons set in place on the module the welding operator requires less finger dexterity and has a greater freedom of movement while performing the attaching operation.

While two embodiments of this invention have been herein illustrated, it will be appreciated by those skilled in the art that variations in the disclosed arrangements, both as to their details and as to the organization of such details may be made without departing from the spirit and scope hereof. Accordingly, it is intended that the foregoing disclosure and the showings made in the drawings shall be considered only as illustrative of the principles of this invention and not construed in a limiting sense.

What is claimed is:

1. A device interconnecting electronic components each having a lead comprising:
an elongated metallic conductor strip having two parts in mutual contact along a plane bisecting the conductor longitudinally and a plurality of apertures each at a predetermined location along said strip and circumscribing a lead, said apertures being formed by displacing said parts transversely to said plane into a frusto-conical portion and a cylindrical portion beginning at the end of the frusto-conical portion having the least diameter, and
a ring of electrical conductive bonding material circumscribing each of said leads for engagement therewith and with the periphery of said frusto-conical portion electrically connecting said component to said conductor.

2. A device interconnecting electronic components each having a lead comprising:
an elongated metallic conductor strip having a rectangular cross section and two parts in mutual contact along a plane bisecting the conductor longitudinally and a plurality of apertures each at a predetermined location along said strip circumscribing a component lead, said apertures being formed by displacing said parts transversely to said plane into a frusto-conical portion and a cylindrical portion beginning at the end of the frusto-conical portion having the least diameter, and
a ring of solder circumscribing each of said leads for engagement therewith and with the periphery of said frusto-conical portion electrically connecting said component to said conductor.

3. A device interconnecting electronic components each having a lead comprising:
a folded elongated metallic conductor strip having mutually contacting portions and a plurality of apertures formed by displacing said contacting portions into a predetermined configuration, each of said apertures having a lead inserted therein and including a frusto-conical portion and a cylindrical portion beginning at the end of the frusto-conical portion having the least diameter, and the height of each portion being substantially equal to the diameter of the cylindrical portion, and
a ring of conductive bonding material circumscribing each of said leads for engagement therewith and with the periphery of said frusto-conical portion electrically connecting said component to said conductor.

4. A device interconnecting electronic components each having a lead comprising:
a folded elongated metallic conductor strip having a rectangular cross section and two parts in mutual contact along a plane bisecting the conductor longitudinally and a plurality of apertures each at a predetermined location along said strip, each of said apertures having a lead inserted therein and including a frusto-conical portion and a cylindrical portion beginning at the end of the frusto-conical portion having the least diameter, and the height of each portion being substantially equal to the diameter of the cylindrical portion, and
a ring of solder circumscribing each of said leads for engagement therewith and with the periphery of said frusto-conical portion electrically connecting said component to said conductor.

References Cited by the Examiner

UNITED STATES PATENTS

| | | | |
|---|---|---|---|
| 966,952 | 8/10 | Remington | 29—551 X |
| 2,322,799 | 6/43 | Frank | 339—22 |
| 2,981,926 | 4/61 | Boardman | 339—22 X |
| 3,012,218 | 12/61 | Cataldo | 339—22 X |
| 3,103,742 | 9/63 | Cruson | 29—551 X |

FOREIGN PATENTS 184,227 12/55 Austria.

LARAMIE E. ASKIN, *Primary Examiner.*

JOHN P. WILDMAN, E. JAMES SAX, *Examiners.*